United States Patent
Wendt et al.

(10) Patent No.: US 8,749,158 B2
(45) Date of Patent: Jun. 10, 2014

(54) DRIVING A LIGHTING DEVICE

(75) Inventors: Matthias Wendt, Wuerselen (DE);
Georg Sauerlaender, Aachen (DE);
Patrick Van Den Bogaart, Geffen (NL)

(73) Assignee: Koninklijke Philips N.V., Eindhoven (NL)

( * ) Notice: Subject to any disclaimer, the term of this patent is extended or adjusted under 35 U.S.C. 154(b) by 742 days.

(21) Appl. No.: 12/527,910

(22) PCT Filed: Feb. 22, 2008

(86) PCT No.: PCT/IB2008/050645
§ 371 (c)(1),
(2), (4) Date: Feb. 23, 2010

(87) PCT Pub. No.: WO2008/104908
PCT Pub. Date: Sep. 4, 2008

(65) Prior Publication Data
US 2010/0141148 A1    Jun. 10, 2010

(30) Foreign Application Priority Data
Feb. 26, 2007  (EP) .................................. 07103058

(51) Int. Cl.
*H05B 41/16* (2006.01)
*H05B 41/14* (2006.01)

(52) U.S. Cl.
USPC ........................................ 315/248; 315/241 R

(58) Field of Classification Search
USPC ...................... 315/209 R, 219, 291, 307, 313; 307/10.8; 362/487
See application file for complete search history.

(56) References Cited

U.S. PATENT DOCUMENTS

| | | | |
|---|---|---|---|
| 5,498,933 A | | 3/1996 | Nakamura |
| 6,381,159 B2 * | | 4/2002 | Oknaian et al. ................. 363/98 |
| 6,930,737 B2 * | | 8/2005 | Weindorf et al. ................ 349/96 |
| 7,105,945 B2 * | | 9/2006 | Shiotsu et al. ............... 307/10.8 |
| 7,244,036 B2 * | | 7/2007 | Murakami et al. .............. 362/20 |
| 7,479,743 B2 * | | 1/2009 | Namba et al. ................. 315/307 |
| 7,636,037 B2 * | | 12/2009 | Ito et al. ......................... 340/458 |
| 2004/0032754 A1 * | | 2/2004 | Yang .......................... 363/56.09 |
| 2004/0075394 A1 | | 4/2004 | Ito et al. |
| 2004/0119446 A1 * | | 6/2004 | Harrington et al. ........... 323/222 |
| 2004/0179366 A1 | | 9/2004 | Takeda et al. |
| 2005/0068776 A1 | | 3/2005 | Ge |
| 2005/0158687 A1 * | | 7/2005 | Dahm ............................. 433/29 |
| 2005/0179393 A1 * | | 8/2005 | Murakami et al. .............. 315/77 |
| 2007/0024213 A1 * | | 2/2007 | Shteynberg et al. .......... 315/291 |
| 2007/0085494 A1 * | | 4/2007 | Takeda et al. ................. 315/316 |

FOREIGN PATENT DOCUMENTS

| | | |
|---|---|---|
| DE | 102006006026 A1 | 8/2006 |
| WO | 0055914 A1 | 9/2000 |
| WO | 2005083804 A1 | 9/2005 |

OTHER PUBLICATIONS

Supertex Inc:"Designing a Boost-Buck (CUK) Converter With the HV9930", Application Note AN-H51, Downloaded From http://www.supertex.com/pdf/app_notes/AN_H51.pdf, 23 page document, Jun. 2005.

* cited by examiner

*Primary Examiner* — Minh D A
(74) *Attorney, Agent, or Firm* — Yuliya Mathis

(57) ABSTRACT

Driving a lighting device by a driving circuit for providing driving power for driving a lighting device, and by a decoupling unit for electrically decoupling the driving circuit from a lighting circuit. The driving power is transferred at least partially from the driving circuit to the lighting circuit, and the lighting device is arranged within the lighting circuit such that its anode is at ground potential of the driving circuit.

19 Claims, 4 Drawing Sheets

DRIVING A LIGHTING DEVICE

TECHNICAL FIELD

The present patent application relates in general to lighting devices and to driving lighting devices.

BACKGROUND

Lighting devices with lighting emitting diodes (LEDs) or organic lighting emitting diodes (OLEDs) exhibit a high brightness and become more important nowadays in the general illumination market. These lighting devices are already employed today for signalling and signage due to their monochrome light. They are expected to replace conventional lamps like incandescent bulbs in the near future. Further advantages of LED lighting devices are their good reliability and their insensibility against vibrations. As a result of this, such lighting devices will especially replace conventional lamps in automotive applications for instance as a tail light.

The above mentioned lighting devices need significant electrical power. A red LED of a tail light requires for example 3W. However, the reliability of lighting devices with such LEDs and their relative light output depend very much on the junction temperature. An increased junction temperature through the high power consumption abbreviates the service life and reduces the relative light output. To limit these effects a good cooling of the lighting device is essential. Therefore, a lighting device may comprise a slug for establishing a thermal contact of high thermal conductivity and the slug is mounted on a heat sink.

In a car environment the minus potential of the battery and the chassis itself are normally connected to ground. Further the heat sink is also connected to ground. When using conventional driving circuits for the LED lighting device, the heat sink and the lighting device have to be electrically insulated against each other. This yields to an increased thermal resistance, which limits the relative light output.

The patent application US 2005/0068776 A1 describes a LED device mounted on a heat sink with a thermal resistance. It is necessary, however, to isolate both the outgoing leads of the LED device which are connected to an applied power supply. The LED device is directly mechanically and thermodynamically connected to a heat sink by a screw. Therefore a thermal resistance exists and furthermore it limits the performance of such a lighting device.

Therefore, it is an object of the present application to provide for sufficient protection of the lighting device against damages through overheating. It is a further object of the present patent application to provide for a long reliability of the lighting device and for a well and consistent radiation. Another object of the present application is to provide for a lighting circuit which allows an optimal cooling of the lighting device.

SUMMARY

These and other objects are solved by a system for driving a lighting device comprising
a driving circuit for providing driving power for driving a lighting device, the lighting device being arranged within a lighting circuit such that its anode is at ground potential of the driving circuit, and the lighting device is arranged within the lighting circuit such that its cathode is at a potential negative to the ground potential wherein the potential at the cathode is electrically decoupled from a positive potential of the driving circuit.

The necessary driving power for the lighting circuit may in many cases be a DC voltage supply with its negative pole being connected to ground. The DC voltage supply may be integrated within the driving circuit and its driving power is transferred to the lighting device by the lighting circuit.

The lighting device of the present application may comprise a LED device which may be mounted on a slug. The purpose of the slug is to establish a thermal contact of high thermal conductivity that allows coupling thermally the LED device to a heat sink as good as possible. Therefore, the anode of the lighting device may be connected to the slug. From this it follows that the LED device is also electrically coupled with the heat sink for an optimal thermal coupling. This system provides the possibility for an easy cooling of the lighting device. So the anode of the lighting circuit is at ground potential. It may be favourable to have the cathode at a potential negative to the ground potential. This arrangement allows a current flow through the lighting device. To enable such an arrangement it is necessary to decouple the potential of the cathode of the lighting device from the positive potential of the driving circuit.

Through the provision of electrical decoupling the potential at the cathode from the positive potential of the driving circuit, it is possible to connect different relative potentials to ground. For example, the negative pole of the driving circuit may be connected to ground and at the same time the anode of the lighting circuit may also be connected to ground.

The electrical decoupling of the positive potential of the driving circuit and the potential at the cathode of the lighting device is achieved by a decoupling unit according to an embodiment. The decoupling unit may be arranged within the lighting circuit. Such a decoupling unit may be a switch and/or a diode. Therefore, an easy cooling of the lighting device is provided as well as a constant monochrome light output.

According to an embodiment, a buck-boost converter topology is used. A buck-boost converter topology may comprise a coil and an optional capacitor for storing energy. A capacitor may be additionally employed for smoothing a current flow through the lighting device. The lighting device may be connected in parallel to the coil and also in parallel to the optional capacitor. Especially a LED may be used as a lighting device. Such a buck-boost converter topology may include also a diode acting as a decoupling unit to avoid a direct current flow from the driving circuit to the lighting device. Further the circuit may exhibit a switching unit. The switching unit may be a semiconductor switch, e.g. a bipolar transistor or a field effect transistor. Through this topology it is possible to connect the anode of the lighting device to ground. Moreover the costs for implementing this topology are low. The wiring of a lighting device can be easily taken. This circuit is especially effective in case that only one LED is used. In automotive applications such lighting devices are often employed.

According to an embodiment, the lighting circuit and the driving circuit are electrically decoupled from each other and the driving power is transferred from the driving circuit to the lighting circuit by the decoupling unit. Such a decoupling unit may allow an employment of several LED devices.

A transformer is used to decouple the driving circuit from the lighting circuit according to an embodiment. A transformer in general allows among other things an electrical isolation between these two parts. The driving power is transferred by its variable magnetic flux. There are different kinds of transformers which may be used, e.g. storage transformers or high frequency transformers.

A flyback converter topology may be used according to an embodiment. A flyback converter may comprise a transformer where the secondary coil of this transformer acts as the supply of the lighting device. The energy is stored inside the airgap of the transformer. Furthermore the lighting circuit on the secondary side may include a diode which avoids a negative current and an optional capacitor for storing energy and smoothing current flow. Also a LED for emitting light is implemented. The driving circuit on the primary side may comprise a DC voltage supply source and a switching unit. The switching unit may be a semiconductor switch, e.g. a bipolar transistor or a field effect transistor. This yields to an easy implementation without great cost.

According to an embodiment, a forward converter topology is alternatively used. The decoupling unit may contain two primary coils and one secondary coil. Thereby the two primary coils may be separated from each other and the driving circuit may comprise a switching unit and a diode. The switching unit may also be a semiconductor switch. Further the lighting circuit may comprise two diodes and an inductor for storing the obtained energy from the DC voltage supply of the driving circuit. The transformer may be a high frequency transformer and may not store energy. A capacitor can also be additionally arranged for smoothing the current. This yields to an improvement of the relative light output without great costs.

According to an embodiment, the switching unit operates the transfer of the driving power from the driving circuit to the lighting circuit. As already mentioned semiconductor switches can be used because of their short switching times and little switching losses. If the switching unit is conductive, energy may be transferred to the lighting circuit. In case the switch is not conductive, energy may not be transferred.

The duty cycle of the switching unit is controlled by the controlling unit. According to an embodiment, the duty cycle of the switching unit may be chosen such that the current through the lighting device is constant. A constant current through the lighting device results in a desired constant light output. The switching unit can be controlled by a pulse width modulated signal.

For controlling the current through the lighting device such that it is constant, it is usually necessary to measure this current. Therefore, a shunt resistance is installed in the lighting circuit such that the current through the shunt resistance and the current through the lighting device are equal according to an embodiment.

This shunt resistance may be connected in series to the lighting device. As a result of this, it may be possible to obtain the current by measuring the voltage drop at the shunt resistance according to an embodiment. From this obtained voltage and the known resistance, the controlling unit can easily calculate the current which flows through the lighting device. It may control the switching unit based on these results. This shunt resistance may be referenced to the ground voltage within a circuit according to a flyback or forward converter topology. This may simplify the measurement of voltage.

According to an embodiment, a cooling unit is directly connected to the lighting device and to ground. The use of a cooling unit if lighting devices with high power consumption are employed may be essential. Otherwise, a damage of such a lighting device may occur. Mainly heat sinks are used for cooling lighting devices. In the present application the lighting device may comprise a slug as heatspreader with a high thermal conductivity. The slug may be directly mounted on the heat sink for effective cooling that is as good as possible. The connection may occur by heat conduction glue. Such a good cooling results in a low LED junction temperature and therefore yields to a much better reliability.

As already mentioned the anode of the lighting device may be electrically connected to the slug. According to an embodiment, the anode of the lighting device is connected to the grounded cooling unit. Isolation may be omitted between the cooling unit and the slug because of the already explained decoupling. This results in a thermal resistance which is as low as possible.

According to an embodiment, the lighting device is not only mounted on the cooling unit but also the lighting circuit, wherein the negative connection to the lighting circuit is made by a mounting screw or a cooling clamp. On the one hand the electrical circuit may be accomplished through an electrical and mechanical connection by the housing of the lighting device and/or lighting circuit and on the other hand by a single connection for example by a wire, screw or a clamp.

If a use of multiple lighting devices is necessary, these can all be mounted on the same cooling unit and have a common ground potential according to an embodiment. It is not necessary to use several heat sinks whereby the effort of implementation of several lighting devices is small.

Further, a transformer with multiple taps on its secondary side may be provided according to an embodiment. Between each of these taps a lighting circuit may be connected. It makes sense to connect the lighting circuits in series. But it is essential for operation that each of the multiple windings is isolated. Using only one transformer yields also small costs.

Another aspect is a method for driving a lighting device with providing within a driving circuit driving power for driving a lighting device, coupling the lighting device within a lighting circuit with its anode to ground potential of the driving circuit, and coupling the lighting device within the lighting circuit with its cathode to a potential negative to the ground potential, and electrically decoupling the potential at the cathode from a positive potential of the driving circuit.

A further aspect is a method for driving a lighting device with receiving driving power from a driving circuit for driving a lighting device, receiving a ground potential of the driving circuit within the anode of the lighting device being arranged within a lighting circuit, and receiving a potential negative to the ground potential at the cathode of the lighting device, wherein the potential at the cathode is electrically decoupled from a positive potential of the driving circuit.

One other aspect is a module for driving a lighting device with receiving means for receiving driving power from a driving circuit for driving a lighting device, the lighting device being arranged within a lighting circuit such that its anode is at ground potential of the driving circuit, and the lighting device is arranged within the lighting circuit such that its cathode is at a potential negative to the ground potential, wherein the potential at the cathode is electrically decoupled from a positive potential of the driving circuit.

These and other aspects of the present patent application become apparent from and will be elucidated with reference to the following figures.

BRIEF DESCRIPTION OF THE DRAWINGS

In the Figures show
FIG. 1 a system according to prior art
FIG. 2 a system according to an embodiment
FIG. 3 a graph illustrating relative light output and junction temperature of several LEDs
FIG. 4a a circuit according to a first embodiment
FIG. 4b a circuit according to a second embodiment FIG. 5 a circuit according to a third embodiment
FIG. 6 a system according to a further embodiment

DETAILED DESCRIPTION OF THE DRAWINGS

The present application provides for an improvement of cooling a lighting device and an improvement of relative light output.

Figure 1:
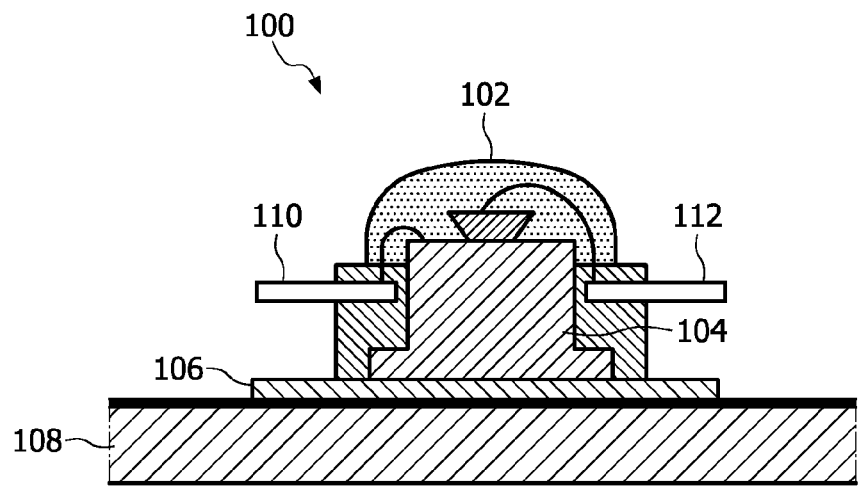

In FIG. 1 a system 100 according to prior art is illustrated. The system 100 comprises a lighting device 102. The lighting device 102 is for example an LED device. Further illustrated is a slug 104 which may consist of a material with high thermal conductivity. The slug 104 is directly connected to the lighting device 102. Illustrated are further a cathode 112 and an anode 110 of the lighting device 102. The anode 110 is connected to the slug 104. Furthermore, a heat sink 108 is illustrated. This heat sink 108 is connected to ground potential. The driving power is at positive potential. Because of this the slug 104 and the heat sink 108 have to be isolated from each other. Therefore, an isolation layer 106 is essential which, however, implicates a higher thermal insulation. Consequently the maximum driving power for the LED at which a certain junction temperature is reached is relatively low and the achievable light output decreases (see also FIG. 3).

Figure 2:
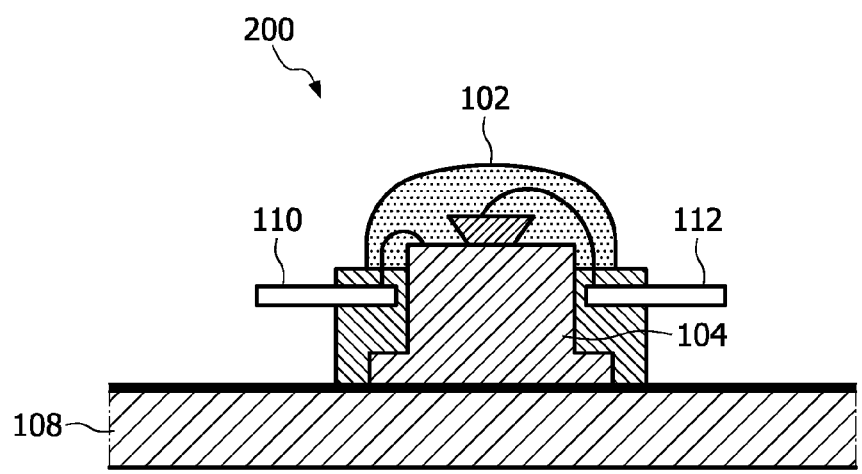

FIG. 2 shows a system 200 according to the present application. The already known units are not mentioned again and they hold the same reference numbers as in FIG. 1. The difference between the system 100 and system 200 is the omitted isolation layer 106. The slug 104 is directly mounted on the heat sink 108 with the result of a significant reduction of the thermal resistance. Electrically this has the consequence that there is an electrical connection from anode 110 over the slug 104 to the grounded heat sink 108. The driving circuit and the lighting circuit have to be able to drive the lighting device 102 with this electrical connection to ground. This follows from the decoupling of at least the positive potential of the voltage supply and the potential at the cathode of the lighting device, which will be explained in detail later.

Figure 3:
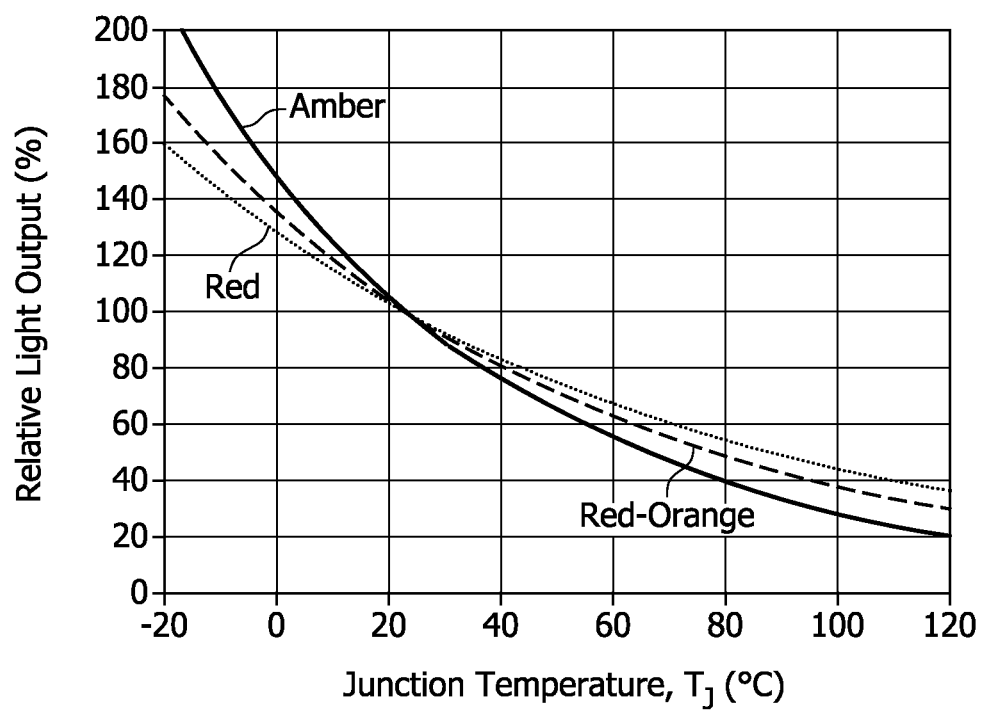

In FIG. 3 a graph illustrates a relation between the relative light output and the junction temperature of LEDs. Three different LEDs, Red, Red-Orange and Amber are measured with reference to their relative light output depending on their junction temperature. At ambient temperature the relative light output is 100%. If the junction temperature increases the relative light output decreases significantly. Good cooling of lighting devices is therefore essential to obtain a high light output.

Figure 4A:
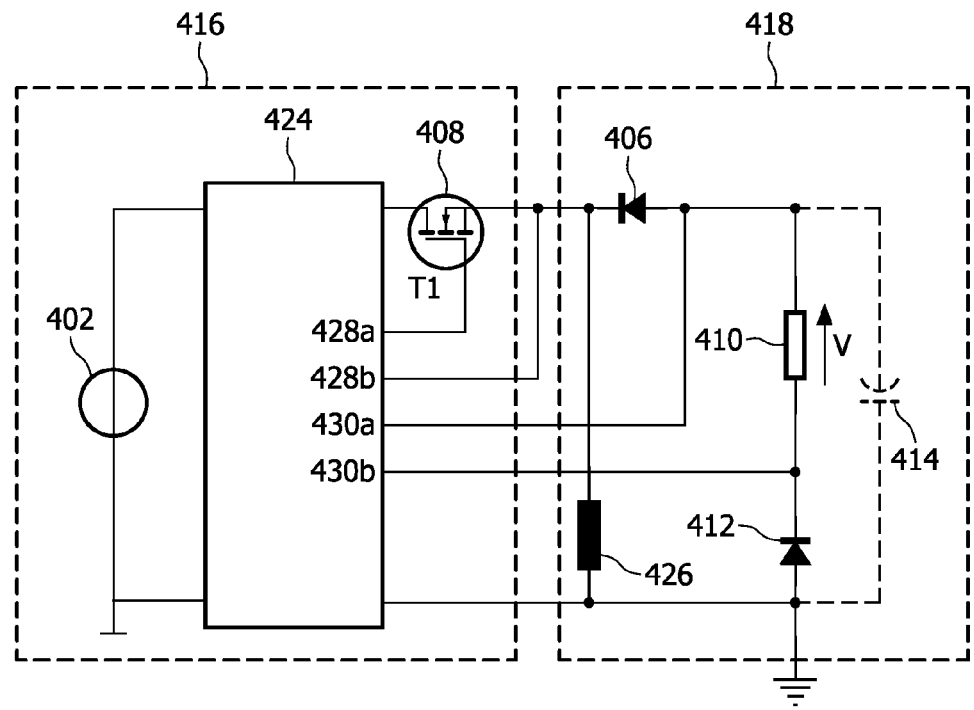

FIG. 4a shows a circuit according to a first embodiment of the present application. The illustrated circuit is arranged in a buck-boost converter topology. The whole circuit can be divided into two parts. One part may be the driving circuit 416 and the other part the lighting circuit 418.

The driving circuit 416 includes a voltage supply 402, e.g. a DC voltage. The negative potential of the voltage supply 402 is at ground. In series connected is a switching unit 408 which may be a field effect transistor according to FIG. 4a. The driving circuit 416 offers also a controlling unit 424 for obtaining a current flow through the lighting device 412 and for controlling the switching unit 408. The controlling unit 424 exhibits terminals 428, 430. The terminals 430a, 430b are arranged for voltage measurement and the terminals 428a, 428b are arranged for controlling the switching unit 408.

The lighting circuit 418 includes the lighting device 412 which may be a LED according to this embodiment. The anode of the lighting device 412 is connected to ground. Therefore, the anode of the lighting device 412 is at the same potential as the negative potential of the voltage supply 402. Furthermore a coil 426 is arranged between ground and the cathode of a diode 406 which acts as a decoupling unit. Its anode is connected by a shunt resistance 410 to the cathode of the lighting device 412. An optional capacitor 414 may be connected in parallel to the shunt resistance 410 and the lighting device 412 for smoothing the current which flows through the lighting device 412.

A buck-boost converter topology exhibits two different states depending on the states of the switching unit 408

During the on-state the switching unit 408 is conductive and a current flows from the voltage supply 402 through the coil 426. The current causes that energy is stored within the coil 426. Because the diode 406 is reversed-bias this current cannot flow to the lighting device 412. In the case an optional capacitor 414 is implemented the current can also not flow through this capacitor 414. Due to the fact energy is already stored within the optional capacitor 414 a current can flow through the shunt resistance 410 and through the lighting device 412 for emitting light. The controlling unit 424 measures the voltage drop at the shunt resistance 410 by the terminals 430a, 430b. From the obtained voltage and the known shunt resistance 410 the controlling unit 424 is able to calculate the current which flows through the lighting device 412. The duty cycle of the switching unit 408 is controlled in such a way that it may switch if the current reaches a predetermined value. If an optional capacitor 414 is not employed the duty cycle may work such that a human eye perceives a constant light output.

In the off-state the switching unit 408 is not conductive and a current from the driving circuit 416 cannot flow to the lighting circuit 418. Instead the coil 426 tries to maintain a current flow and respectively the coil 426 tries to act against the changing of the magnetic flux. Through this a current flows through the lighting device 412, the shunt resistance 410 and the diode 406 which is not reversed-bias. Therefore light is emitted. In case an optional capacitor 414 is implemented this capacitor 414 is reloaded by the current. The controlling unit 424 determines the current flow through the lighting device 412 for controlling the switching unit 408 in the above mentioned way. The duty cycle generally depends on the used components of the system illustrated in FIG. 4a. This embodiment yields to a constant relative light output by a correct duty cycle of the switching device 408.

Figure 4B:
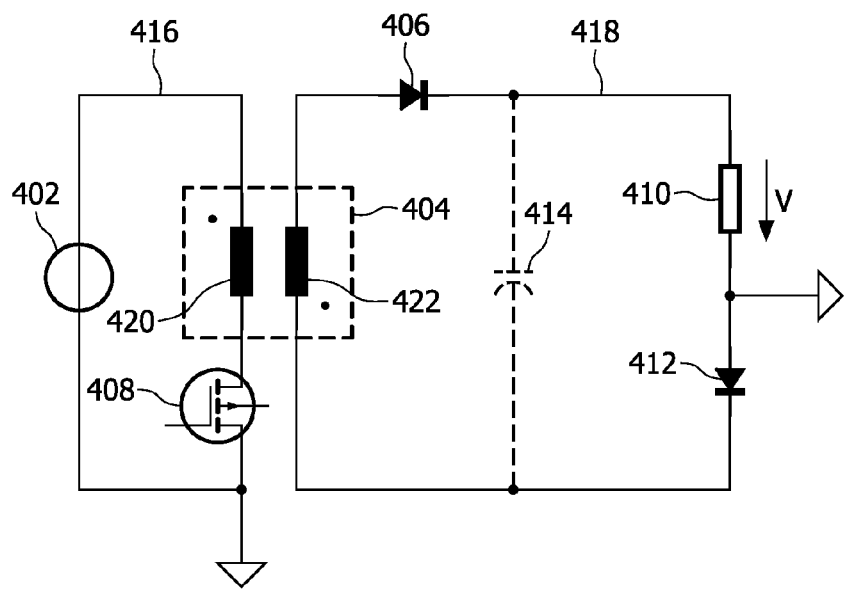

FIG. 4b shows a circuit according to a second embodiment. The shown circuit is arranged in a flyback converter topology. The already known units hold the same reference numbers as in FIG. 4a. The circuit can also be divided into a driving circuit 416 and a lighting circuit 418. The driving circuit 416 comprises the DC voltage supply 402 which negative potential is at ground. Further a field effect transistor is used as a switching unit 408 as well. The driving circuit 416 further comprises a first coil 420 of a transformer 404. The transformer 404 decouples the driving circuit 416 electrically from the lighting circuit 418. For example, the transformer 404 may be a storage transformer.

The lighting circuit 418 comprises a second coil 422 of the transformer 404 and the diode 406 which is connected in series. Further, the shunt resistance 410 and the lighting device 412 are connected in series as well. The lighting device 412 is also an LED according to the illustrated embodiment. The anode of the lighting device 412 is at ground. An optional capacitor 414 can be connected in parallel to the shunt resistance 410 and the lighting device 412.

When the switching unit 408 is conductive, a current flows through the first coil 420 of the transformer 404 and induces an increased magnetic flux. In other words, energy is stored into the transformer 404 during the conductive stage. At the same time, the diode 406 avoids a current flow because of the secondary winding 422 of the transformer 404 is negative. At the same time the capacitor 414 supplies its stored energy to the lighting device 412, upon which light is emitted. The current flow through the lighting device 412 is the same as through the shunt resistance 410. So this current may be calculated by the controlling unit (not shown) by the measured voltage and the known shunt resistance 410. The duty cycle works like the duty cycle of the first embodiment (see FIG. 4a).

When the switching unit 408 is not conductive, a current cannot flow within the driving circuit 416. But the coils 420, 422 try to maintain a current flow and respectively they try to act against the changing of the magnetic flux. Thus a current flows through the diode 406 which is not reversed-bias and the stored energy is transferred to the lighting device 412 and to the optional capacitor 414. On the one hand the current reloads the optional capacitor 414 and on the other hand it provides for emitting light. The current through the lighting device 412 is controlled in the same way like in the conductive state.

This embodiment yields to a constant relative light output by a correct duty cycle of the switching device 408, whereby the driving circuit 416 and the lighting circuit 418 are electrically decoupled. The duty cycle depends on the used components of the system of FIG. 4b.

Figure 5:
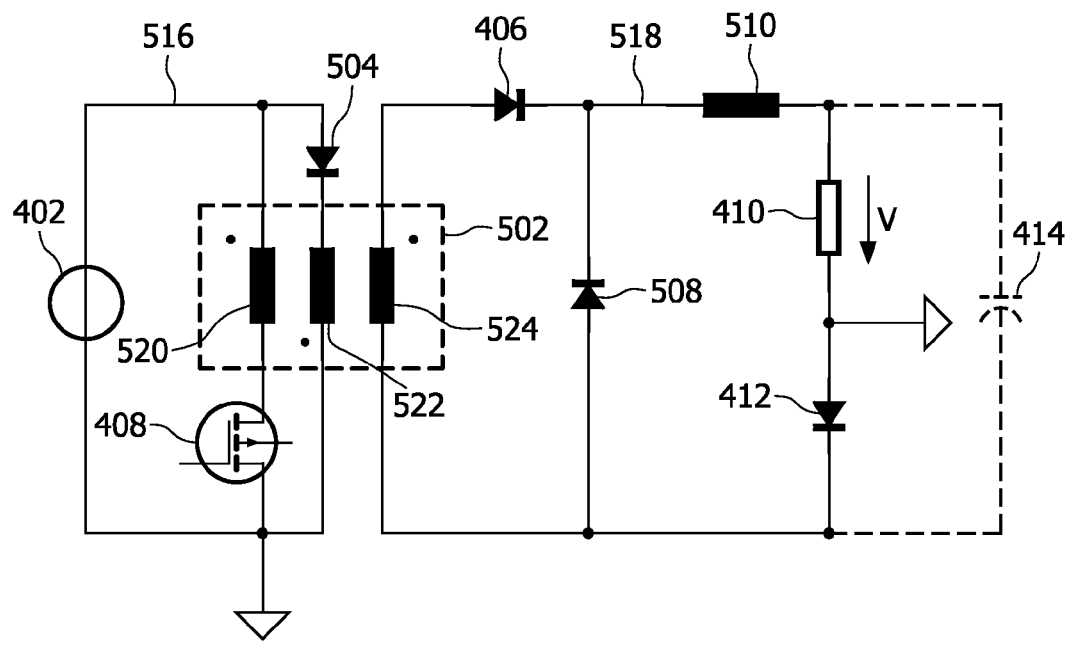

FIG. 5 shows a circuit according to a third embodiment. The circuit is arranged in a forward converter topology. The already known units are not mentioned again and they hold the same reference numbers as in FIG. 4a and FIG. 4b. The circuit can also be divided into a driving circuit 516 and a lighting circuit 518. But these circuits 516, 518 differ from the circuits 416, 418 of FIG. 4b in that the driving circuit 516 provides two primary coils 520, 522 of a transformer 502 and an additionally diode 504. The transformer 502 may be a high frequency transformer.

The lighting circuit 518 comprises additionally an inductance 510, which is connected between the diode 406 and the shunt resistance 410 in series. A diode 508 is connected in parallel to the inductance 510, the shunt resistance 410 and the lighting device 412.

The switching unit 408 is controlled in the same way as in the embodiment of FIG. 4a or FIG. 4b.

When the switching unit 408 is conductive, a current flow induces an increased magnetic flux and energy is transferred from the primary coil 520 to the secondary coil 524. The energy is not stored in the core of the transformer 502, but this energy is directly forwarded to the lighting device 412 by a current. This current flows also through the inductance 510 whereby energy is stored within its magnetic field. If a capacitor 414 is additionally installed, the current also loads the capacitor 414. The capacitor 414 may be provided to smooth the current through the lighting device 412.

When the switching unit 408 is not conductive, energy cannot be transferred from the driving circuit 516 to the lighting circuit 518. The remaining magnetic flux on the primary side is relieved by the diode 504. In the lighting circuit the inductor 510 tries to maintain the current flow. Therefore, a current flows through the diode 508 and also through the lighting device 412. This results in a constant light output. The current is controlled in the same way as in the previous embodiments and the duty cycle for operating the switching unit 408 depends also on the used components of the system of FIG. 5.

Figure 6:
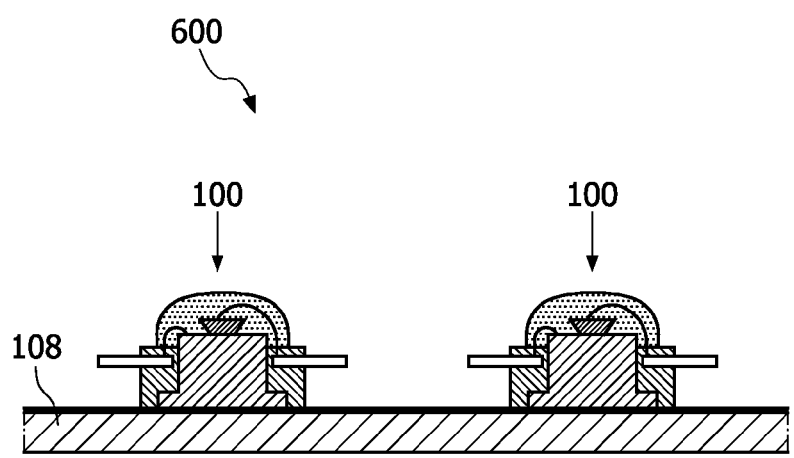

FIG. 6 illustrates a system 600 according to a further embodiment. Two systems 100 are directly mounted on the same heat sink 108 without isolation. Therefore, a transformer has to comprise multiple isolated windings for a connection of these systems 100. These systems 100 may be arranged between consecutive taps of such a transformer. Further it is possible to implement several systems 100 on the same heat sink 108.

A main field of application for this invention may be the automotive market, e.g. a tail light. Especially in this field, lighting devices with high power consumption are used for signalling and signage due to their monochrome light. But the illumination market in general is a possible field of application as well.

While there have been shown and described and pointed out fundamental novel features of the invention as applied to a preferred embodiment thereof, it will be understood that various omissions and substitutions and changes in the form and details of the devices and methods described may be made by those skilled in the art without departing from the spirit of the invention. For example, it is expressly intended that all combinations of those elements and/or method steps, which perform substantially the same function in substantially the same way to achieve the same results, are within the scope of the invention. Moreover, it should be recognised that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. It should also be recognised that any reference signs shall not be constructed as limiting the scope of the claims.

The invention claimed is:

1. A system for driving a lighting device comprising:
   a driving circuit for providing driving power for driving a lighting device including an anode and a cathode, the driving circuit comprising a voltage supply and a switching unit;
   a lighting circuit comprising the lighting device, such that the anode is at ground potential of the driving circuit and the cathode is at a potential negative to the ground potential, and an inductance connected between the anode of the lighting device and the driving circuit; and
   a decoupling unit for electrically decoupling the potential at the cathode from a positive potential of the driving circuit,
   wherein the switching unit is configured to selectively operate a driving current which flows through the decoupling unit, the inductance storing power when the switching unit is in an on-state and providing power to the lighting device when the switching unit is in an off-state, and
   wherein the anode is electrically coupled to a cooling unit via a slug directly mounted to the cooling unit to enhance thermal conductivity between the lighting device and the cooling unit.

2. The system of claim 1, wherein the decoupling comprises electrically decoupling the driving circuit from the lighting circuit and transferring driving power at least partially from the driving circuit to the lighting circuit.

3. The system of claim 2, wherein the decoupling unit comprises a transformer.

4. The system of claim 3, wherein the transformer has on its secondary side multiple taps of multiple isolated coils such that between each of two consecutive taps the lighting circuits are connected.

5. The system of claim 2, wherein the system comprises forward converter topology.

6. The system of claim 2, further comprising multiple lighting devices mounted on a common cooling unit with an electrical contact to a common ground.

7. The system of claim 1, further comprising a shunt resistance in the lighting circuit such that current through the shunt resistance and the current through the lighting device are equal.

8. The system of claim 1, wherein the lighting device is electrically connected to the lighting circuit via at least one of a mounting screw and a cooling clamp.

9. A system comprising:
a driving circuit comprising a DC voltage supply having a negative pole connected to ground potential;
a lighting circuit comprising:
a lighting device having an anode connected to the ground potential and a cathode connected to a potential negative to the ground potential;
a shunt resistance connected in series with the lighting device; and
a capacitor connected in parallel with the series connected shunt resistance and lighting device;
a decoupling unit comprising a decoupling diode having an anode connected to the cathode of the lighting device and a cathode connected to the driving circuit, and a coil connected between the cathode of the decoupling diode arid the ground potential, the decoupling unit electrically decoupling the cathode of the lighting device from a positive potential of the driving circuit; and
a slug thermally coupled to a heat sink and configured to transfer heat from the light device, wherein the anode of the lighting device is electrically coupled to the heat sink via the slug,
wherein the driving circuit provides power to the lighting circuit and the coil stores energy when the driving circuit is in an on-state.

10. The system of claim 9, wherein the coil provides power to the lighting circuit when the driving circuit is in an off-state, such that current flows through the lighting device and the decoupling diode.

11. A system comprising:
a driving circuit for providing driving power for driving a lighting device;
a lighting circuit comprising:
a lighting device having an anode connected to ground potential of the driving circuit; and
a decoupling unit configured to electrically decouple the cathode of the lighting device from a positive potential of the driving circuit, the decoupling unit comprising a decoupling diode having an anode connected to the cathode of the lighting device and a cathode connected to the driving circuit; and
a coil connected between the cathode of the decoupling diode and the ground potential; and
a slug thermally coupled to a heat sink and configured to transfer heat from the light device, wherein the anode of the lighting device is electrically coupled to the heat sink via the slug.

12. The system of claim 11, wherein the system comprises buck-boost converter topology.

13. The system of claim 11, wherein the driving circuit further comprises a switching unit for selectively operating a driving current which flows through the decoupling unit.

14. The system of claim 13, wherein the driving circuit further comprises a controlling unit for controlling the switching unit such that a current through the lighting device is constant.

15. The system of claim 14, wherein the coil stores energy when the switching unit is in an on-state and provides the current through the lighting device when the switching unit is in an off-state.

16. The system of claim 14, wherein the controlling unit obtains the current of the lighting device from a measured voltage at a shunt resistance connected in series with the lighting device for controlling the switching unit.

17. A system comprising:
a driving circuit comprising a DC voltage supply having a negative pole connected to ground potential;
a lighting circuit comprising:
a lighting device having an anode connected to the ground potential and a cathode connected to a potential negative to the ground potential; and
an inductance connected in series with the anode of the lighting device, the inductance adapted to store energy for providing current to the lighting device;
a transformer comprising first and second primary coils located in the driving circuit and a secondary coil located in the lighting circuit, the transformer electrically decoupling the cathode of the lighting device from a positive potential of the driving circuit; and
a slug thermally coupled to a heat sink and configured to transfer heat from the light device, wherein the anode of the lighting device is electrically coupled to the heat sink via the slug.

18. The system of claim 17, wherein the lighting circuit further comprises:
a diode having an anode connected to the secondary coil and a cathode connected to the inductance; and
a shunt resistance connected in series between the inductance and the anode of the lighting device.

19. The system of claim 18, wherein the lighting circuit further comprises:
a diode connected in parallel to the inductance, the shunt resistance and the lighting device.

* * * * *